US011869452B2

(12) United States Patent
Goto

(10) Patent No.: US 11,869,452 B2
(45) Date of Patent: Jan. 9, 2024

(54) LIQUID CRYSTAL DISPLAY

(71) Applicant: Sharp Display Technology Corporation, Kameyama (JP)

(72) Inventor: Naoko Goto, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/095,256

(22) Filed: Jan. 10, 2023

(65) Prior Publication Data

US 2023/0274715 A1 Aug. 31, 2023

Related U.S. Application Data

(60) Provisional application No. 63/314,283, filed on Feb. 25, 2022.

(51) Int. Cl.
*G09G 3/36* (2006.01)
*G09G 3/20* (2006.01)
*G09G 3/34* (2006.01)

(52) U.S. Cl.
CPC ......... *G09G 3/3607* (2013.01); *G09G 3/2074* (2013.01); *G09G 3/3426* (2013.01); *G09G 2300/023* (2013.01); *G09G 2300/0465* (2013.01); *G09G 2320/0233* (2013.01); *G09G 2320/0626* (2013.01); *G09G 2360/16* (2013.01)

(58) Field of Classification Search
CPC ..... G09G 3/2074; G09G 3/2007–2081; G09G 3/34–3696; G09G 2300/0452; G09G 2300/0465; G09G 2300/023; G09G 2320/0271–0276; G09G 2360/16
See application file for complete search history.

(56) References Cited

U.S. PATENT DOCUMENTS

| | | | | |
|---|---|---|---|---|
| 11,257,448 | B2 * | 2/2022 | Chen | G09G 3/3607 |
| 2008/0088649 | A1 | 4/2008 | Ikeno et al. | |
| 2012/0092385 | A1 | 4/2012 | Ikeno et al. | |
| 2016/0042701 | A1 * | 2/2016 | Furumoto | G02F 1/1347 345/694 |
| 2016/0379575 | A1 * | 12/2016 | Kawai | G09G 3/3611 345/694 |
| 2018/0151103 | A1 * | 5/2018 | Koudo | G09G 3/3607 |

(Continued)

FOREIGN PATENT DOCUMENTS

| | | |
|---|---|---|
| JP | 2008122940 A | 5/2008 |
| JP | 2017015768 A | 1/2017 |
| JP | 2018084760 A | 5/2018 |

*Primary Examiner* — Patrick F Marinelli
(74) *Attorney, Agent, or Firm* — ScienBiziP, P.C.

(57) ABSTRACT

In an image processing device, for each of one or two or more picture elements among a plurality of picture elements, the one or two or more picture elements having an input grayscale value included in the input image data being equal to or less than a first predetermined value, the second panel data correction unit corrects the second aperture ratio of each of at least one pixel among the plurality of pixels, the at least one pixel facing the one or two or more picture elements, so that an actual transmittance gets closer to a theoretical transmittance, and the first panel data generation unit generates the first aperture ratio for each of the plurality of picture elements by dividing a normalized input grayscale value included in the input image data by a normalized luminance included in the panel luminance distribution data.

6 Claims, 13 Drawing Sheets

(56) References Cited

U.S. PATENT DOCUMENTS

| | | | | |
|---|---|---|---|---|
| 2019/0392749 | A1* | 12/2019 | Koudo ................. | G09G 3/3607 |
| 2020/0226968 | A1* | 7/2020 | Koudo ................. | G09G 3/3648 |
| 2021/0327373 | A1* | 10/2021 | Chen .................... | G09G 3/3607 |
| 2022/0392415 | A1* | 12/2022 | Goto .................... | G09G 3/3426 |

* cited by examiner

LIQUID CRYSTAL DISPLAY

CROSS REFERENCE TO RELATED APPLICATION

The present application claims priority from Provisional Application No. 63/314,283, the content to which is hereby incorporated by reference into this application.

BACKGROUND OF THE DISCLOSURE

1. Field of the Disclosure

The present disclosure relates to a liquid crystal display.

2. Description of the Related Art

In recent years, a liquid crystal display using two liquid crystal panels has been developed, as disclosed in JP 2008-122940 A, JP 2017-015768 A, JP 2018-84760 A, and the like. This liquid crystal display includes a color liquid crystal panel, a monochrome liquid crystal panel, a backlight, and an image processing device.

The color liquid crystal panel includes a plurality of picture elements each having color filters for different colors, respectively. The image processing device controls the color of light transmitted through each of the plurality of picture elements by controlling the light transmittance of each of the plurality of picture elements.

The monochrome liquid crystal panel includes a plurality of pixels. The image processing device controls a luminance of light transmitted through each of the plurality of pixels by controlling the transmittance of light transmitted through each of the plurality of pixels.

SUMMARY

In the liquid crystal display as described above, the actual transmittance of light transmitted through a picture element or a pixel deviates from the theoretical transmittance of light transmitted through the picture element or the pixel for various reasons. Thus, the liquid crystal display cannot display an image at a theoretical luminance corresponding to an input grayscale value input to the image processing device.

The present disclosure has been made in view of the aforementioned problem, and an objective thereof is to provide a display that can display an image at a luminance closer to a theoretical luminance corresponding to an input grayscale value.

An image processing device according to the present disclosure is an image processing device causing a display panel unit to display an image, the display panel unit including a first liquid crystal panel including a plurality of picture elements and a second liquid crystal panel facing the first liquid crystal panel and including a plurality of pixels, the image processing device including a second panel data generation unit that generates second panel data for controlling a second aperture ratio of each of the plurality of pixels based on input image data, a second panel data correction unit that corrects the second panel data, a second panel luminance distribution generation unit that generates panel luminance distribution data of the second liquid crystal panel based on the second panel data after correction, and a first panel data generation unit that generates first panel data for controlling a first aperture ratio of each of the plurality of picture elements based on the input image data and the panel luminance distribution data of the second liquid crystal panel, in which, for each of one or two or more picture elements among the plurality of picture elements, the one or two or more picture elements having a normalized input grayscale value included in the input image data being equal to or less than a first predetermined value, the second panel data correction unit corrects the second aperture ratio of each of at least one pixel among the plurality of pixels, the at least one pixel facing the one or two or more picture elements, so that an actual transmittance gets closer to a theoretical transmittance, and the first panel data generation unit generates the first aperture ratio for each of the plurality of picture elements by dividing the normalized input grayscale value included in the input image data by a normalized luminance included in the panel luminance distribution data.

DESCRIPTION OF EMBODIMENTS

Figure 1:
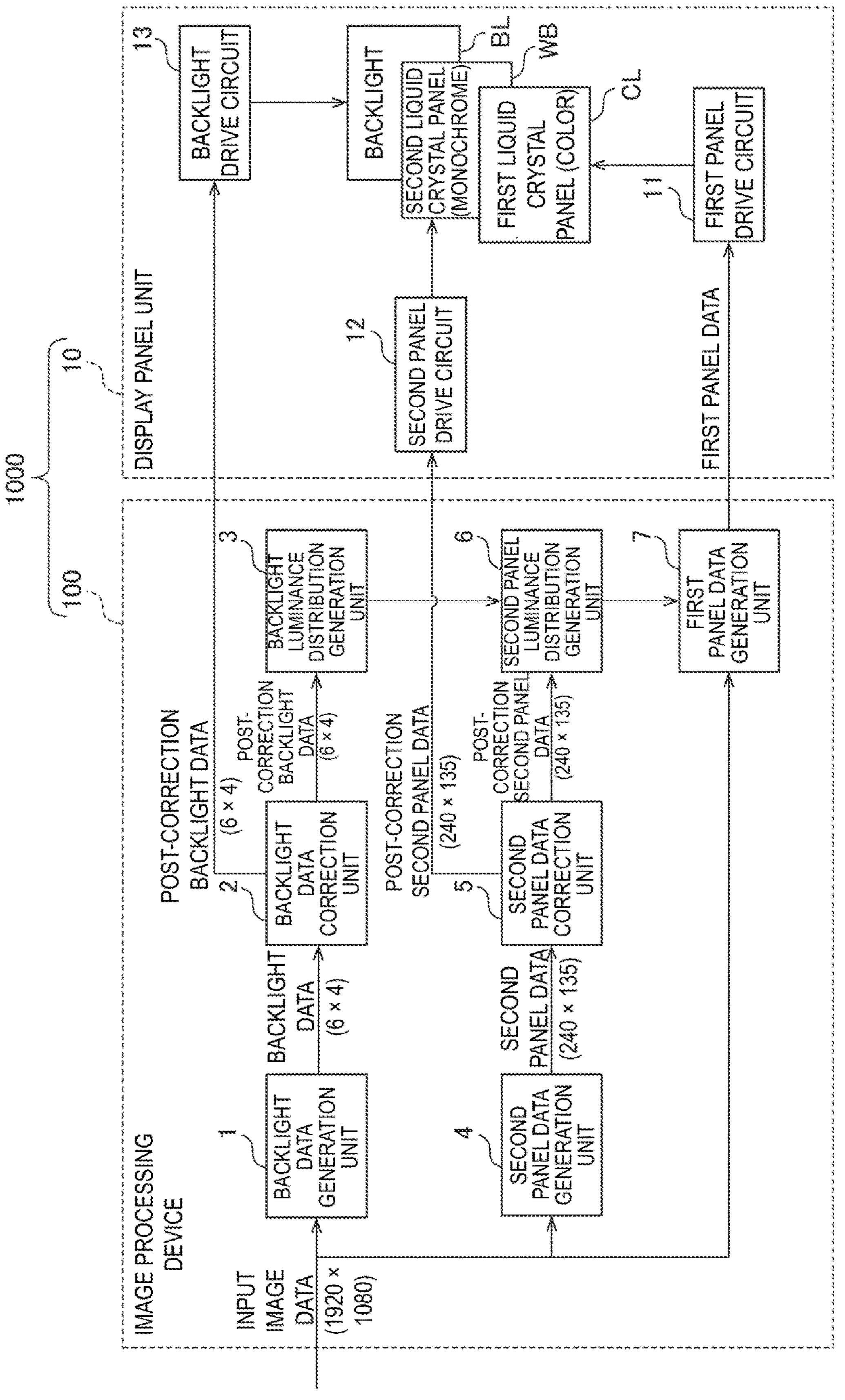
FIG. 1 is a block diagram illustrating an overall configuration of a liquid crystal display common to each embodiment.

Hereinafter, an image processing device according to the present disclosure will be described with reference to the accompanying drawings. Further, in the drawings, the same or equivalent elements are denoted by the same reference numerals and signs, and repeated descriptions thereof will be omitted.

Configurations Common to all Embodiments

FIG. 1 is a block diagram illustrating an overall configuration of a liquid crystal display 1000. Further, the starting points of the arrows in FIG. 1 indicate transmission sources of data, and the end points of the arrows in FIG. 1 indicate transmission destinations of the data.

The liquid crystal display 1000 includes a display panel unit 10 and an image processing device 100 that controls the display panel unit 10 as illustrated in FIG. 1. In the liquid crystal display 1000 of the present embodiment, the display panel unit 10 and the image processing device 100 are physically integrated. However, the display panel unit 10 and the image processing device 100 may be physically separated as long as they are communicatively connected to each other.

The display panel unit 10 includes a first liquid crystal panel CL, a first panel drive circuit 11, a second liquid crystal panel WB, a second panel drive circuit 12, a backlight BL, and a backlight drive circuit 13.

The first liquid crystal panel CL (see FIG. 2) is referred to as a color liquid crystal panel capable of performing color display. The first liquid crystal panel CL includes a plurality of pixels 1PX (see FIG. 5). The plurality of pixels 1PX include a plurality of subpixels. In the present specification, a subpixel is referred to as a "picture element PE" (see FIG. 5). Each of the plurality of pixels 1PX includes a picture element PE(R), a picture element PE(G), and a picture element PE(B). The picture element PE(R) has a red color filter through which red light is transmitted. The picture element PE(G) has a green color filter through which green light is transmitted. The picture element PE(B) has a blue color filter through which blue light is transmitted.

However, a combination of the color filters of the plurality of picture elements PE constituting one pixel 1PX of the first liquid crystal panel CL is not limited to the combination of red, green, and blue, and may be, for example, a combination of yellow, magenta, and cyan. The resolution for each color of the plurality of picture elements PE constituting the first liquid crystal panel CL is, for example, 1920×1080.

The first panel drive circuit 11 drives a liquid crystal layer of each of the plurality of picture elements PE constituting the first liquid crystal panel CL so as to realize a first aperture ratio of each of the plurality of picture elements PE specified with first panel data generated by the image processing device 100. Further, in the present specification, a first aperture ratio of a picture element PE means an actual aperture area of the picture element PE with respect to a maximum aperture area of the picture element PE.

Figure 2:
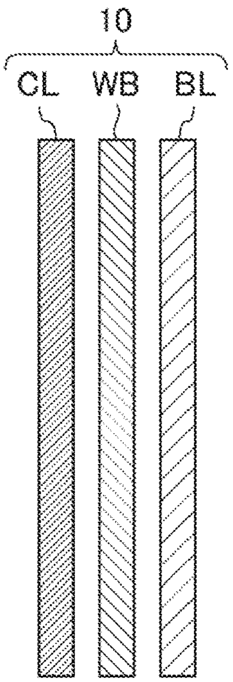
FIG. 2 is a schematic cross-sectional view of a display panel unit of the liquid crystal display common to each embodiment.

The second liquid crystal panel WB is referred to as a monochrome liquid crystal panel capable of performing black-and-white display (see FIG. 2). The second liquid crystal panel WB includes a plurality of pixels 2PX (see FIG. 4). Each of the plurality of pixels 2PX has no color filter. Each of the plurality of pixels 2PX functions as an aperture for adjusting a transmission amount of light emitted by the backlight BL. The area of the aperture of a pixel 2PX is variable. The second liquid crystal panel WB is disposed to face the first liquid crystal panel CL. The resolution of the plurality of pixels 2PX constituting the second liquid crystal panel WB is, for example, 240×135. Further, the pixels 2PX of the second liquid crystal panel WB may include subpixels.

The second panel drive circuit 12 drives a liquid crystal layer of each of the plurality of pixels 2PX constituting the second liquid crystal panel WB so as to realize a second aperture ratio of each of the plurality of pixels 2PX specified with post-correction second panel data generated by the image processing device 100. Further, in the present specification, a second aperture ratio of a pixel 2PX means an actual aperture area of the pixel 2PX with respect to a maximum aperture area of the pixel 2PX.

The backlight BL is disposed to face the second liquid crystal panel WB (see FIG. 2). The backlight BL includes a plurality of light-emitting regions LER (see FIG. 3). The resolution of the plurality of light-emitting regions LER constituting the backlight BL is, for example, 6×4. Further, each of the plurality of light-emitting regions LER includes a plurality of light emitting diodes (LEDs). The plurality of LEDs are controlled such that light emission aspects of the plurality of LEDs in each of the light-emitting regions LER are identical and thus one entire light-emitting region LER emits light uniformly to some extent. Then, local dimming for controlling an amount of independent light emission by each of the plurality of light-emitting regions LER is performed.

The backlight drive circuit 13 drives each of the plurality of light-emitting regions LER constituting the backlight BL to realize output of each of the plurality of light-emitting regions LER specified with post-correction backlight data generated by the image processing device 100.

The image processing device 100 causes the display panel unit 10 to display an image based on input image data input from the outside. The resolution of the input image data is the same as the resolution of the plurality of picture elements PE, which is 1920×1080. The input image data is data with which a plurality of input grayscale values each input to the plurality of picture elements PE of the first liquid crystal panel CL can be specified. In addition, the input image data is data with which the input image can be specified with the plurality of input grayscale values. The input image specified with the input image data corresponds to an output image displayed on the display panel unit 10.

The image processing device 100 includes a backlight data generation unit 1, a backlight data correction unit 2, a backlight luminance distribution generation unit 3, a second panel data generation unit 4, a second panel data correction unit 5, a second panel luminance distribution generation unit 6, and a first panel data generation unit 7. In the present embodiment, the backlight data generation unit 1, the backlight data correction unit 2, the backlight luminance distribution generation unit 3, and the second panel data generation unit 4 are all configured by electronic circuits dedicated to image processing of the present embodiment. Furthermore, the second panel data correction unit 5, the second panel luminance distribution generation unit 6, and the first panel data generation unit 7 are all configured by electronic circuits dedicated to image processing of the present embodiment.

Further, the backlight data generation unit 1, the backlight data correction unit 2, the backlight luminance distribution generation unit 3, and the second panel data generation unit 4 may each be configured by a general-purpose semiconductor device called a central processing unit (CPU). In this case, a respective function of each of the backlight data generation unit 1, the backlight data correction unit 2, the backlight luminance distribution generation unit 3, and the second panel data generation unit 4 is realized by the CPU executing an image processing program installed in each of the units. Further, in the present embodiment, the backlight data generation unit 1, the backlight data correction unit 2, the backlight luminance distribution generation unit 3, the second panel data generation unit 4, the second panel data correction unit 5, the second panel luminance distribution generation unit 6, and the first panel data generation unit 7 are configured by components that can be recognized as physically different parts.

The input image data is transmitted from the outside of the liquid crystal display 1000 to the image processing device 100. The input image data, that is, an input grayscale value of each of the plurality of picture elements PE constituting the first liquid crystal panel CL, is transmitted to each of the first panel data generation unit 7, the second panel data generation unit 4, and the backlight data generation unit 1 inside the image processing device 100.

The backlight data generation unit 1 generates backlight data for controlling the output of the plurality of light-emitting regions LER based on the input image data. Backlight data is data corresponding to a resolution of 6×4. The backlight data generation unit 1 generates, from the input image data, a value of the pre-correction output of each of the plurality of light-emitting regions LER constituting the backlight BL (e.g., a lighting rate=actual luminance value/maximum luminance value). The backlight data generation unit 1 acquires, as an example, a representative value of the input grayscale values of several picture elements PE, that is, several subpixels, included in one virtual region facing one light-emitting region LER. The representative value is, for example, the maximum value, the average value, the median value, the value of 80% of the maximum value, or the like of the input grayscale values of the several picture elements PE included in one virtual region facing one certain light-emitting region LER. Thereafter, the backlight data generation unit 1 generates, as the value of the output of the one certain light-emitting region LER, a value obtained by dividing the representative value of the input grayscale values of the several picture elements PE in the one virtual region by the upper limit value of the input grayscale values. The upper limit value of the input grayscale values refers to a maximum value of the input grayscale values.

The backlight data generation unit 1 includes a lookup table (LUT) that defines a correspondence relationship between input grayscale data and backlight data. However, the backlight data generation unit 1 may generate the backlight data by using the input image data through calculation without generating data based on a data table.

Further, the backlight data generation unit 1 may generate backlight data that has undergone a smoothing process (blurring).

The backlight data correction unit 2 corrects backlight data. For example, the backlight data correction unit 2 increases the output value of each of the plurality of light-emitting regions LER specified with the backlight data. The backlight data correction unit 2 includes a LUT defining a correspondence relationship between pre-correction backlight data and post-correction backlight data. However, the backlight data correction unit 2 may correct the post-correction backlight data through calculation by using the pre-correction backlight data, rather than performing correction based on the data table. The backlight data correction unit 2 transmits the post-correction backlight data to the backlight drive circuit 13. The post-correction backlight data is data corresponding to a resolution of 6×4.

The backlight luminance distribution generation unit 3 generates backlight luminance distribution data of the backlight BL based on the post-correction backlight data. The backlight luminance distribution data is luminance distribution data of light, of the light emitted by the backlight BL, which has reached a position of a plurality of pixels 2PX of the second liquid crystal panel WB.

The value of the backlight luminance distribution data may be determined by taking the point spread function (PSF) applied from the light-emitting regions LER included in the backlight BL to the pixels 2PX included in the second liquid crystal panel WB into consideration. The backlight luminance distribution generation unit 3 includes an LUT defining a correspondence relationship between the post-correction backlight data and the backlight luminance distribution data of the backlight BL. However, the backlight luminance distribution generation unit 3 may generate the backlight luminance distribution data of the backlight BL through calculation by using the post-correction backlight data, rather than generating the data based on the data table.

The second panel data generation unit 4 generates second panel data for controlling the second aperture ratio of the plurality of pixels 2PX based on the input image data. The second panel data is data corresponding to a resolution of 240×135. The second panel data generation unit 4 uses the input image data to generate the second aperture ratio before the correction of each of the plurality of pixels 2PX constituting the second liquid crystal panel CL.

The second panel data generation unit 4 first acquires, as an example, a representative value of the input grayscale values of several picture elements PE, that is, several subpixels, included in one virtual region facing one certain pixel 2PX. The representative value is, for example, the maximum value, the average value, the median value, the value of 80% of the maximum value, or the like of the input grayscale values of the several picture elements PE included in one virtual region. Thereafter, the second panel data generation unit 4 generates, as the second aperture ratio of the one certain pixel 2PX, the value obtained by dividing the representative value of the input grayscale values of the several picture elements PE in the one virtual region by the upper limit value of the input grayscale values. The upper limit value of the input grayscale values is the maximum value of the input grayscale values that can be specified with the input image data.

The second panel data generation unit 4 includes a LUT defining a correspondence relationship between the input image data and the second panel data. However, the second panel data generation unit 4 may generate the second panel data through calculation by using the input image data, rather than generating the data based on the data table.

Further, the second panel data generation unit 4 may generate a second aperture ratio obtained after a smoothing process (angle-of-view filtering) as the second aperture ratio of the one certain pixel 2PX.

The second panel data correction unit 5 corrects the second panel data. The post-correction second panel data is data corresponding to a resolution of 240×135. For example, the second panel data correction unit 5 increases the second aperture ratio of each of the plurality of pixels 2PX specified with the second panel data. The second panel data correction unit 5 includes a LUT defining a correspondence relationship between the pre-correction second panel data and the post-correction second panel data.

However, the second panel data correction unit 5 may correct the post-correction second panel data through calculation by using the pre-correction second panel data, rather than correcting based on the data table. The second panel data correction unit 5 transmits the post-correction second panel data to the second panel drive circuit 12.

The second panel luminance distribution generation unit 6 generates panel luminance distribution data of the second liquid crystal panel WB based on the post-correction second panel data and the luminance distribution data of the backlight BL. Specifically, for each of the plurality of pixels 2PX, the product of the second aperture ratio of one pixel 2PX and the luminance of the backlight BL at the position of the one pixel 2PX is calculated. As a result, the luminance at a position of each of the plurality of pixels 2PX of the second liquid crystal panel WB is estimated.

The value of the panel luminance distribution data of the second liquid crystal panel WB may be determined taking a point spread function (P S F) applied from the pixels 2PX included in the second liquid crystal panel WB to the picture elements PE included in the first liquid crystal panel CL into consideration. The panel luminance distribution data is luminance distribution data of light, of the light emitted by the backlight BL, which has reached a position of a plurality of picture elements PE of the first liquid crystal panel CL.

The second panel luminance distribution generation unit 6 includes a LUT defining a correspondence relationship between the post-correction second panel data and the panel luminance distribution data of the second liquid crystal panel WB. However, the second panel luminance distribution generation unit 6 may generate the panel luminance distribution data of the second liquid crystal panel WB through calculation by using the post-correction second panel data, rather than generating the data based on the data table.

The first panel data generation unit 7 generates first panel data for controlling the first aperture ratio of the plurality of picture elements PE based on the input image data and the panel luminance distribution data of the second liquid crystal panel WB. The first panel data generation unit 7 includes an LUT defining a correspondence relationship between the input image data, the luminance distribution data of the second liquid crystal panel WB, and the first panel data.

However, the first panel data generation unit 7 may generate the first panel data through calculation by using the input image data and the luminance distribution data of the second liquid crystal panel WB, rather than generating the data based on the data table. The first panel data generation unit 7 transmits the first panel data to the first panel drive circuit 11.

The image processing device 100 can independently generate control data for each of the backlight BL and the second liquid crystal panel WB for the following reasons.

(1) Two data paths for generating post-correction backlight data and post-correction second panel data are independent of each other. In more detail, the post-correction backlight data is generated from the input image data processed by the backlight data generation unit 1 and the backlight data correction unit 2. Furthermore, the post-correction second panel data is generated from the input image data processed by the second panel data generation unit 4 and the second panel data correction unit 5. In these two data paths, the backlight data and the second panel data are irrelevant to each other. That is, because the backlight data and the second panel data are processed independently of each other, processing of one of the backlight data and the second panel data does not affect processing of the other of the backlight data and the second panel data.

(2) In addition, although particularly the post-correction backlight data and the post-correction second panel data are corrected by the backlight data correction unit 2 and the second panel data correction unit 5, the correction of the units is independently performed. For this reason, the backlight data correction unit 2 and the second panel data correction unit 5 can change characteristics of the post-correction backlight data and the post-correction second panel data independently and freely from each other.

Thus, the degree of freedom in selecting a combination of two types of control data including the second panel data and the backlight data is high. As a result, variations in display characteristics of the liquid crystal display 1000 can be increased.

However, if control data of each of the backlight BL and the second liquid crystal panel WB is independently generated, any value of an output of the backlight BL and any aperture ratio of the second liquid crystal panel WB may be independently selected. For this reason, there is concern that the luminance of the picture elements PE of the first liquid crystal panel CL may be insufficient. If the luminance of the picture elements PE of the first liquid crystal panel CL is insufficient, the input image specified with the input image data cannot be displayed.

Thus, in the liquid crystal display 1000, the backlight data correction unit 2 and the second panel data correction unit 5 correct the backlight data and the second panel data to satisfy the next correction condition. The correction condition is that. for each of the plurality of picture elements PE, the luminance at a position corresponding to one picture element PE that can be specified with the luminance distribution data of the second liquid crystal panel WB is greater than or equal to the luminance of the one picture element PE that can be specified with the input image data.

Specifically, the backlight data correction unit 2 and the second panel data correction unit 5 correct the backlight data and the second panel data to satisfy the condition $Bx \times Mx \geq Ix$. Note that $0 \leq Bx \leq 1$, $0 \leq Mx \leq 1$, and $0 \leq Ix \leq 1$.

Bx represents a ratio of an actual luminance of the backlight BL with respect to the maximum luminance of the backlight BL at a position corresponding to each of the plurality of picture elements PE. Mx represents a second aperture ratio of the pixel 2PX of the second liquid crystal panel WB at a position corresponding to each of the plurality of picture elements PE. Ix represents a ratio of input grayscale values actually input to a corresponding picture element PE among the plurality of picture elements PE with respect to the maximum input grayscale value that can be input to each of the plurality of picture elements PE, that is, a ratio of the actual luminance of the corresponding picture element PE with respect to the maximum luminance of the corresponding picture element PE.

According to the control of the image processing device 100 of the present embodiment as described above, the occurrence of an inconvenient situation in which the luminance of the picture elements PE corresponding to an input grayscale value cannot be realized even if the first aperture ratio of the picture element PE is set to 100% can be prevented.

In the present embodiment, the backlight data correction unit 2 and the second panel data correction unit 5 correct the backlight data and the second panel data, respectively, as follows. For each of the plurality of light-emitting regions LER of the backlight BL, the output of one light-emitting region LER that can be specified with the post-correction backlight data is equal to or greater than the output of one light-emitting region LER that can be specified with the pre-correction backlight data.

Furthermore, for each of the plurality of pixels 2PX of the second liquid crystal panel WB, the second aperture ratio of one pixel 2PX that can be specified with the post-correction second panel data is equal to or greater than the second aperture ratio of one pixel 2PX that can be specified with the pre-correction second panel data. According to this configuration, the backlight data correction unit 2 and the second panel data correction unit 5 can easily establish the correction conditions of the backlight data and the second panel data, respectively.

In other words, the backlight data correction unit 2 increases the post-correction output of the plurality of light-emitting regions LER of the backlight BL more than the pre-correction output of the plurality of light-emitting regions LER of the backlight BL. In addition, the second panel data correction unit 5 increases the post-correction second aperture ratio of the plurality of pixels 2PX of the second liquid crystal panel WB more than the pre-correction second aperture ratio of the plurality of pixels 2PX of the second liquid crystal panel WB.

On the other hand, the first panel data generation unit 7 determines the first aperture ratio of the plurality of picture elements PE so that display of the input image specified with the input image data is realized on the display panel unit 10 based on the input image data and the panel luminance distribution data of the second liquid crystal panel WB. As a result, the luminance of the plurality of light beams transmitted through the plurality of picture elements PE substantially matches the luminance of the input image at a plurality of positions corresponding to each of the plurality of picture elements PE specified with the input image data. According to this configuration, display of the input image specified with the input image data can be easily realized on the display panel unit 10.

FIG. 2 is a cross-sectional view of the display panel unit 10 of the liquid crystal display 1000 common to each embodiment. As illustrated in FIG. 2, in the display panel unit 10, the first liquid crystal panel CL, the second liquid crystal panel WB, and the backlight BL are arranged in that order. The first liquid crystal panel CL and the second liquid crystal panel WB are disposed to face each other. The second liquid crystal panel WB and the backlight BL are also disposed to face each other.

Figure 3:
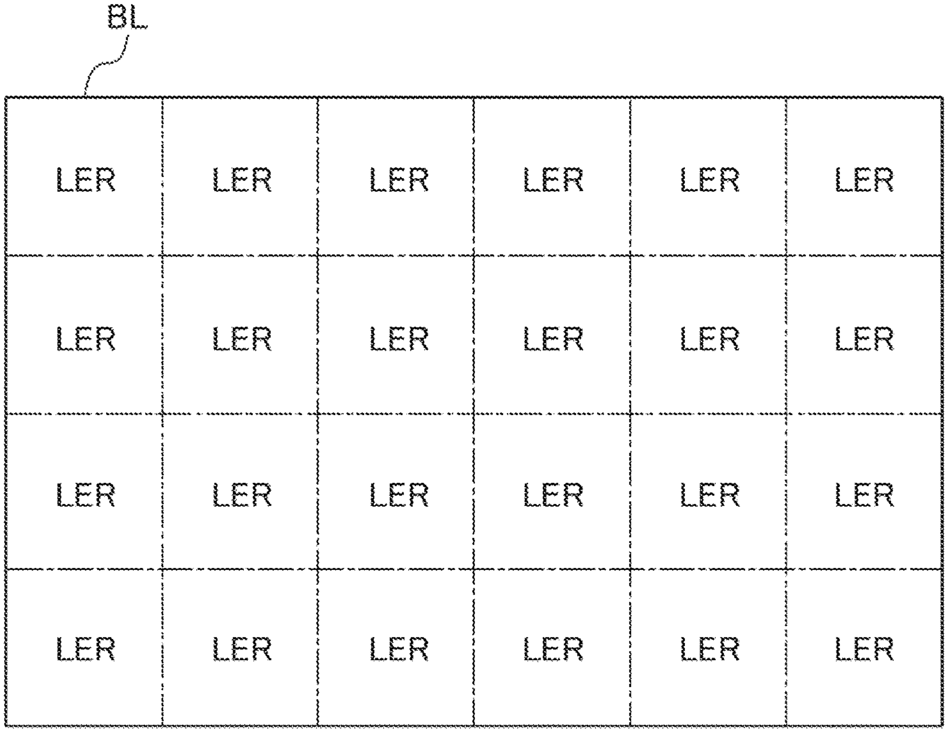
FIG. 3 is a plan view of a plurality of light-emitting regions of a backlight of the liquid crystal display common to each embodiment.

FIG. 3 is a plan view of a plurality of light-emitting regions LER of the backlight BL of the liquid crystal display 1000 common to each embodiment. As illustrated in FIG. 3, the backlight BL is divided into a plurality of light-emitting regions LER, specifically, into 24 (=6×4) light-emitting regions LER. The image processing device 100 independently controls the output of each of the plurality of light-emitting regions LER. A plurality of LEDs in each of the plurality of light-emitting regions LER are controlled in an identical light emission mode.

Figure 4:
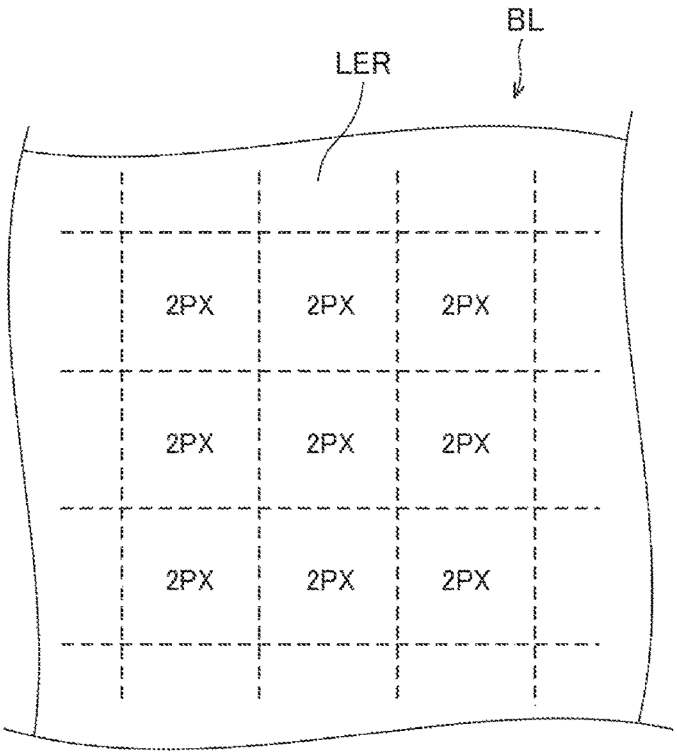
FIG. 4 is a diagram for describing a relationship between a light-emitting region of the backlight and pixels of a second liquid crystal panel (monochrome) of the liquid crystal display common to each embodiment.

FIG. 4 is a diagram for describing a relationship between a light-emitting region LER of the backlight BL and pixels 2PX of the second liquid crystal panel (monochrome) WB of the liquid crystal display 1000 common to each embodiment. As can be seen from FIG. 4, there are several pixels 2PX in one virtual region facing each of the plurality of light-emitting regions LER.

Figure 5:
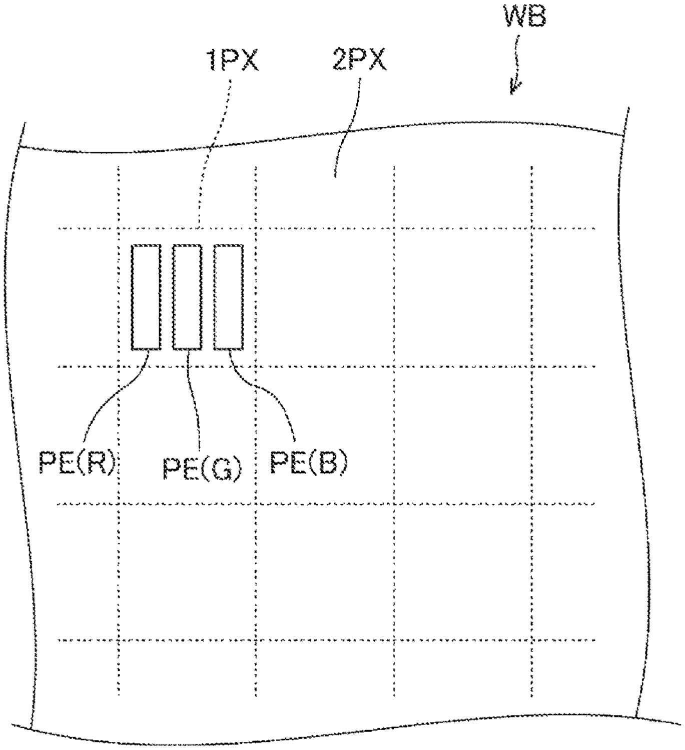
FIG. 5 is a diagram for describing a relationship between a pixel of the second liquid crystal panel (monochrome) and picture elements of a first liquid crystal panel (color) of the liquid crystal display common to each embodiment.

FIG. 5 is a diagram for describing a relationship between a pixel 2PX of the second liquid crystal panel (monochrome) WB and a pixel 1PX and picture elements PE of the first liquid crystal panel (color) CL of the liquid crystal display 1000 common to each embodiment. As can be seen from FIG. 5, there are several pixels 1PX in one virtual region facing each of a plurality of pixels 2PX, and each of the several pixels 1PX includes three picture elements PE. That is, there are several picture elements PE in one virtual region facing each of the plurality of pixels 2PX.

As can be seen in comparison to FIG. 3 to FIG. 5, the plurality of picture elements PE of the first liquid crystal panel CL, the plurality of pixels 2PX of the second liquid crystal panel WB, and the plurality of light-emitting regions LER of the backlight BL have a smaller resolution in that order.

Each of the pixels 2PX of the second liquid crystal panel WB is controlled by the image processing device 100 so as to realize the luminance having the maximum value of the input grayscale values of several picture elements PE in one virtual region facing the pixels PX that can be specified with the input image data, for example.

Each of the light-emitting regions LER of the backlight BL is controlled by the image processing device 100 so as to realize the luminance at the maximum value of the input grayscale values of several picture elements PE in one virtual region facing the light-emitting regions LER that can be specified with the input image data, for example.

Liquid crystal displays 1000 of the first to fourth embodiments of the present disclosure having the configuration described above as a prerequisite will be described.

In each embodiment, a deviation of the transmittance of the single unit of each of the first liquid crystal panel CL and the second liquid crystal panel WB from a theoretical value $\gamma$ ($\gamma$=2.2), and a deviation of the transmittance of a combination of the first liquid crystal panel CL and the second liquid crystal panel WB from the theoretical value $\gamma$ ($\gamma$=2.2) occur. By reducing these deviations through data correction using a lookup table (LUT), the display luminance of each of the plurality of picture elements PE of the liquid crystal display 1000 is brought closer to the theoretical display luminance.

Further, in the following, an aperture ratio (0≤aperture ratio≤1) means the proportion of the size of an actual aperture of a pixel 2PX or a picture element PE with respect to the size of an aperture of the pixel 2PX or the picture element PE when the aperture is open the widest. A transmittance (0≤transmittance≤1) means the ratio of the amount of light actually transmitted through the aperture of a pixel 2PX or a picture element PE to the maximum amount of light transmitted through the aperture of the pixel 2PX or the picture element PE. A normalized input grayscale value (0≤normalized input grayscale value≤1) means the ratio of an actual input grayscale value to a maximum input grayscale value. A normalized luminance (0≤normalized luminance≤1) means the ratio of an actual luminance to a maximum luminance.

In addition, in the liquid crystal display 1000 of each embodiment, the plurality of picture elements PE of the first liquid crystal panel CL has a higher resolution than the plurality of pixels 2PX of the second liquid crystal panel WB.

First Embodiment

A liquid crystal display 1000 according to a first embodiment will be described with reference to FIGS. 6 to 8.

In the present embodiment, the image processing device 100 does not dim the backlight BL. In other words, the image processing device 100 lights each of the plurality of light-emitting regions LER of the backlight BL at a maximum input grayscale value included in the input grayscale data. In other words, the image processing device 100 causes each of the plurality of light-emitting regions LER of the backlight BL to emit light at a luminance of the maximum value that each of the plurality of light-emitting regions LER may take. Thus, the plurality of light-emitting regions LER have substantially the same luminance and emit light at a luminance close to the standard value. Thus, in the first embodiment, the backlight BL may have a structure in which a light emission amount of each of the plurality of light-emitting regions LER can be independently controlled. In addition, in the first embodiment, the backlight data generation unit 1, the backlight data correction unit 2, and the backlight luminance distribution generation unit 3 may not be provided in the block diagram illustrated in FIG. 1.

In the present embodiment, each of a plurality of normalized input grayscale values included in the input image data is represented by C ($C=Cin\hat{}\gamma$). The normalized input grayscale value C is a value obtained by gamma-correcting the inverse gamma-corrected normalized input grayscale value Cin. For this reason, in the image processing device 100, the normalized input grayscale value C is processed in a linear space as data. In addition, the normalized input grayscale value C is the ratio of an actual input grayscale value to a maximum input grayscale value.

In addition, in the display panel unit 10 according to the present embodiment, the plurality of picture elements PE constituting the first liquid crystal panel CL, the plurality of pixels 2PX constituting the second liquid crystal panel WB, and the plurality of light-emitting regions LER constituting the backlight BL have resolutions descending in that order.

Figure 6:
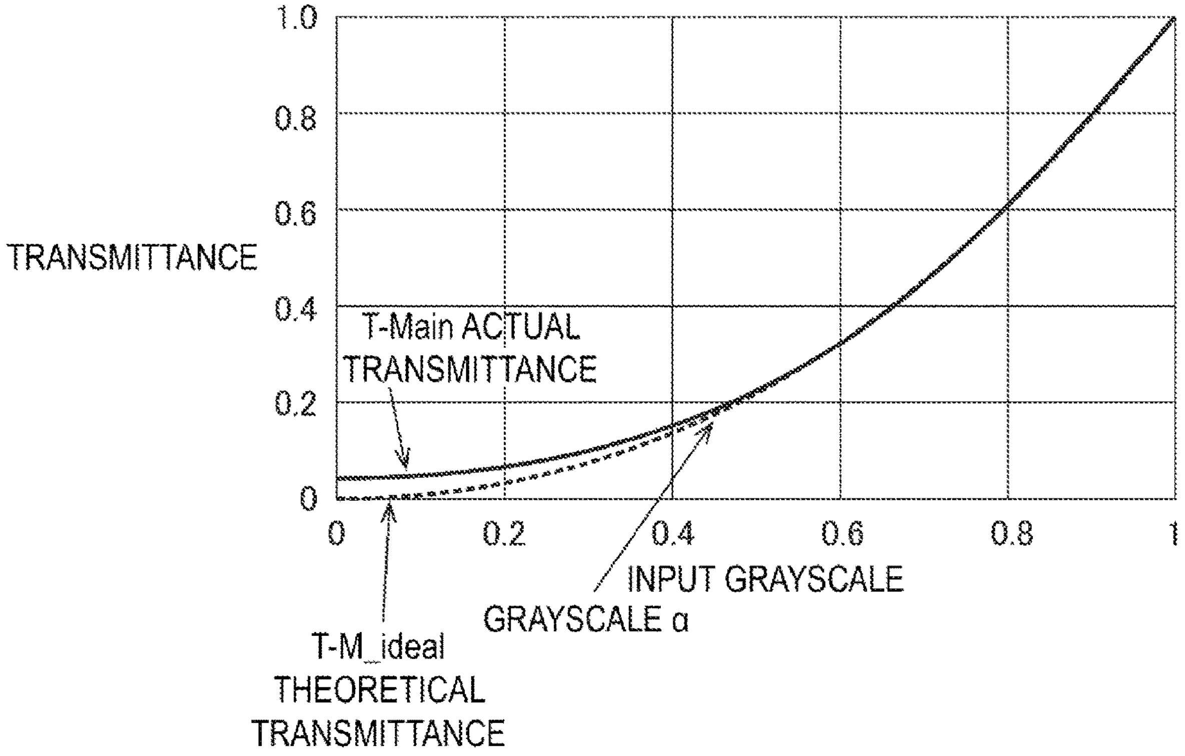
FIG. 6 is a graph showing a relationship between a theoretical transmittance and an actual transmittance of a picture element of the first liquid crystal panel of a liquid crystal display according to a first embodiment.

FIG. 6 is a graph showing a relationship between a theoretical transmittance and an actual transmittance of the first liquid crystal panel CL according to the present embodiment.

As illustrated in FIG. 6, the actual transmittance T-main of each picture element PE of the first liquid crystal panel CL deviates from the theoretical transmittance T-M_ideal of γ characteristics at grayscale values that are equal to or less than a first predetermined value α. In other words, the first predetermined value α is a grayscale value at which the normalized luminance of each picture element PE of the first liquid crystal panel CL starts diverging from the theoretical value.

Figure 7:
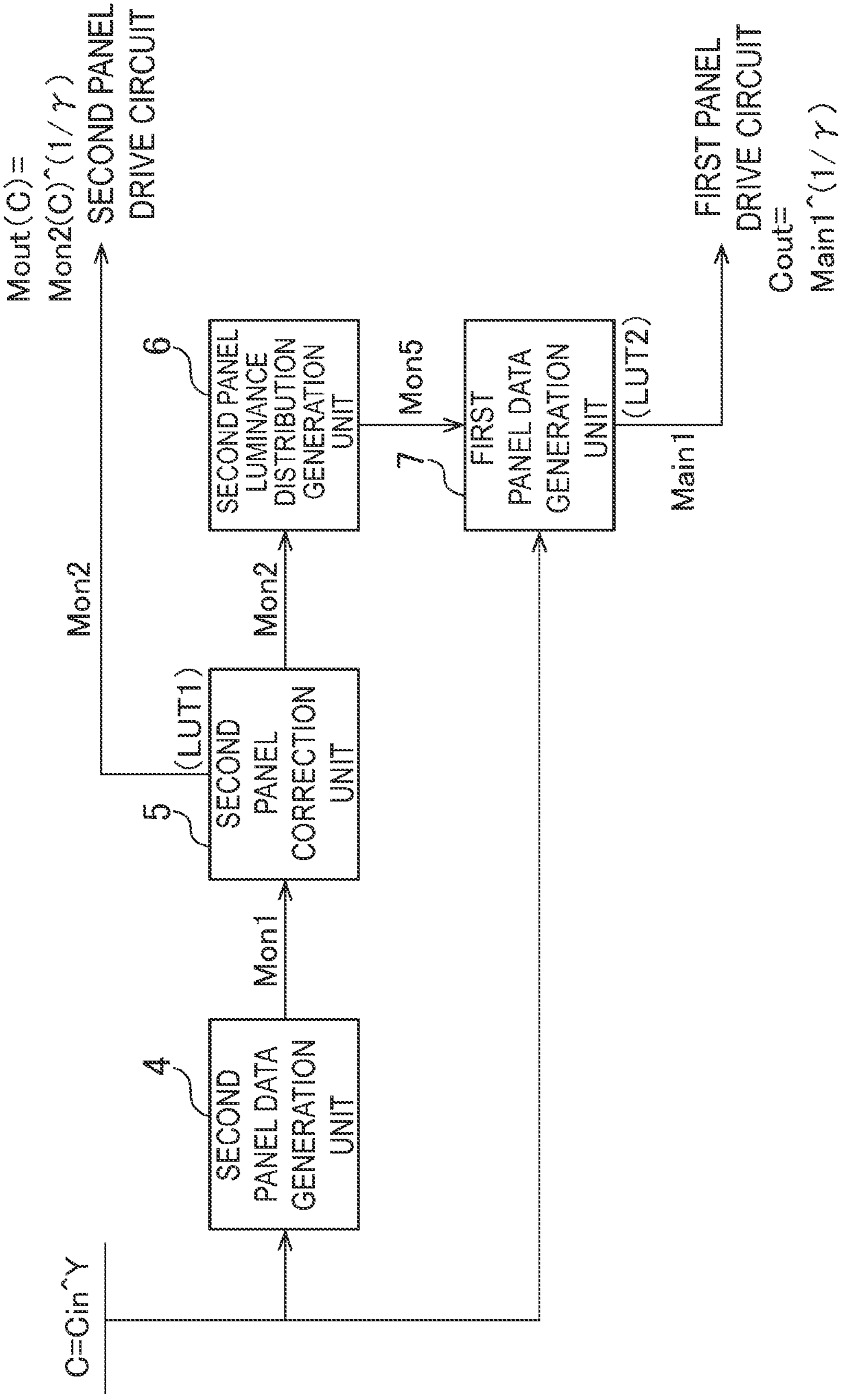
FIG. 7 is a block diagram for describing a characteristic configuration of the liquid crystal display according to the first embodiment.

FIG. 7 is a block diagram for describing a characteristic configuration of the liquid crystal display according to the first embodiment.

As illustrated in FIG. 7, the characteristic configuration of the present embodiment is as follows.

The second panel data correction unit 5 of the present embodiment corrects the second panel data, as follows, for each of one or two or more picture elements PE among the plurality of picture elements PE, of which the input grayscale value C included in the input image data is less than or equal to the first predetermined value α. In other words, the second panel data correction unit 5 corrects a second aperture ratio Mon1 of at least one pixel 2PX facing the above-described one or two or more picture elements PE among the plurality of pixels 2PX of the second liquid crystal panel WB so as to offset the deviation of the actual transmittance of the first liquid crystal panel CL from the theoretical transmittance. Specifically, the second panel data correction unit 5 corrects the second panel data to reduce the second aperture ratio Mon1 before correction. As a result, a second aperture ratio Mon2 after correction that is smaller than the second aperture ratio Mon1 before correction is obtained.

Here, the ratio of an actual input grayscale value to a maximum input grayscale value included in the input image data is assumed to be a normalized input grayscale value C. In addition, the ratio of an actual panel luminance to a maximum value of a panel luminance Mon5 included by panel luminance distribution data is assumed to be a normalized luminance Mon5. The first panel data generation unit 7 according to the present embodiment generates a first aperture ratio Main1 as first panel data by dividing the normalized input grayscale value C by the normalized luminance Mon5 for each of the plurality of picture elements PE.

Hereinafter, a characteristic configuration of the liquid crystal display 1000 according to the present embodiment described above will be described in detail.

It is necessary to correct a divergence of the actual normalized luminance of the picture elements PE described above from the theoretical normalized luminance of the picture elements PE. For this reason, when the grayscale value is equal to or less than the first predetermined value α, the second panel data correction unit 5 corrects the second aperture ratio Mon1 of the second panel data before correction so that the second aperture ratio Mon2 of the second panel data after correction is less than 1.

In addition, the amount of light transmitted through the second liquid crystal panel WB and radiated to the first liquid crystal panel CL has to be not insufficient. Thus, the second panel data correction unit 5 corrects the second aperture ratio Mon1 of the second panel data before correction so that $x \leq Mon2(x)$:<x=Mon1> is satisfied.

Here, Mon2 is the second aperture ratio of the pixels 2PX of the second liquid crystal panel WB included in the second panel data after correction. Mon1 is the second aperture ratio of the pixels 2PX of the second liquid crystal panel WB included in the second panel data before correction. Mon1 is a maximum value of a plurality of normalized input grayscale values C each corresponding to a plurality of pixels 1PX in a specific region, for example, a region facing a light-emitting region LER.

The second panel data correction unit 5 generates a second aperture ratio $Mout(C)=Mon2(C)\hat{}(1/\gamma)$ of the pixels 2PX through inverse gamma correction of the second aperture ratio Mon2, and outputs the aperture ratio Mout(C) to the second panel drive circuit 12.

For example, the second panel data correction unit 5 may correct Mon1 so that $Mon2(x) \geq T\text{-}M\_ideal(x)/T\text{-}Main(x)$: <x=Mon1> is satisfied. T-M_ideal(x) is the theoretical transmittance of each picture element PE of the first liquid crystal panel CL, and T-Main(x) is the actual transmittance of each picture element PE of the first liquid crystal panel CL. By correcting Mon1 in this manner, the second panel data correction unit 5 can offset the deviation of the actual transmittance of each picture element PE of the first liquid crystal panel CL from the theoretical transmittance of each picture element PE.

The above-described correction by the second panel data correction unit 5 may be performed using the lookup table LUT1. The LUT1 is a lookup table with the above-described correction formula applied. For example, LUT1 may be created so that LUT1(x)≥T-M_ideal(x)/T-Main(x): <x=Mon1> is satisfied.

Processing of the first panel data generation unit 7 may also be performed using a lookup table. In the first embodiment, the first panel data generation unit 7 includes a lookup table LUT2. The lookup table LUT2 makes a change such that the first aperture ratio Main1 of each of the group of picture elements PE included in the generated first panel data monotonically increases with respect to the normalized input grayscale value C of each of the group of picture elements PE included in the input grayscale data. In this way, it is possible to prevent the grayscale from inverting when gradation or the like is displayed. Specifically, for example, LUT2(x)=1/x. Here, x represents a normalized luminance Mon5. The first panel data generation unit 7 performs the calculation Main1=C×LUT2 (Mon5). In other words, the first panel data generation unit 7 uses the lookup table LUT2 to divide the normalized input grayscale value C by the normalized luminance Mon5 for the picture element PE corresponding to the normalized input grayscale value C that is equal to or less than the first predetermined value α. The first aperture ratio Main1 is thereby generated.

Furthermore, the first panel data generation unit 7 performs inverse gamma correction of the generated first aperture ratio Main1 to output the first aperture ratio Cout of the picture elements PE to the first panel drive circuit 11.

The flow of data in the above-described image processing device 100 is as follows when being described using only symbols.

$$C=\mathrm{Cin}\hat{}\gamma$$

$$\mathrm{LUT1}(x)\geq T\text{-}M\_\mathrm{ideal}(x)/T\text{-}\mathrm{Main}(x): \langle x=Mon1\rangle$$

$$Mon2=\mathrm{LUT1}(Mon1)$$

Mon1 is a maximum value of a plurality of normalized input grayscale values C each corresponding to the plurality of picture elements PE being faced by one pixel 2PX.

$$\mathrm{LUT2}(x)=1/x$$

$$\mathrm{Main1}=C\times\mathrm{LUT2}(Mon5)$$

Mon5 is the amount of light reaching the first liquid crystal panel CL (including the influence of an optical filter and the influence of the resolution of the first liquid crystal panel CL) with Mon2 display.

$$C\mathrm{out}=\mathrm{Main1}\hat{}(1/\gamma)$$

The second panel luminance distribution generation unit 6 also performs processing for correcting the resolution of the normalized luminance Mon5 to be equal to the resolution of the normalized input grayscale value C when the resolution of the second aperture ratio Mon2 of each pixel 2PX is lower than the resolution of the normalized input grayscale value C.

In the present embodiment, the second panel luminance distribution generation unit 6 calculates the normalized luminance Mon5 assuming that a normalized luminance LED1 of all of the light-emitting regions LER of the backlight BL is constant.

The first aperture ratio Cout=Main1^(1/γ) of the picture elements PE included in the first panel data output from the image processing device 100 is data obtained from inverse gamma correction of the first aperture ratio Main1 of the picture elements PE generated by the first panel data generation unit 7. That is, each of the backlight data output to the backlight drive circuit 13, the second panel data output to the second panel drive circuit 12, and the first panel data output to the first panel drive circuit 11 is processed in the gamma space.

Figure 8:
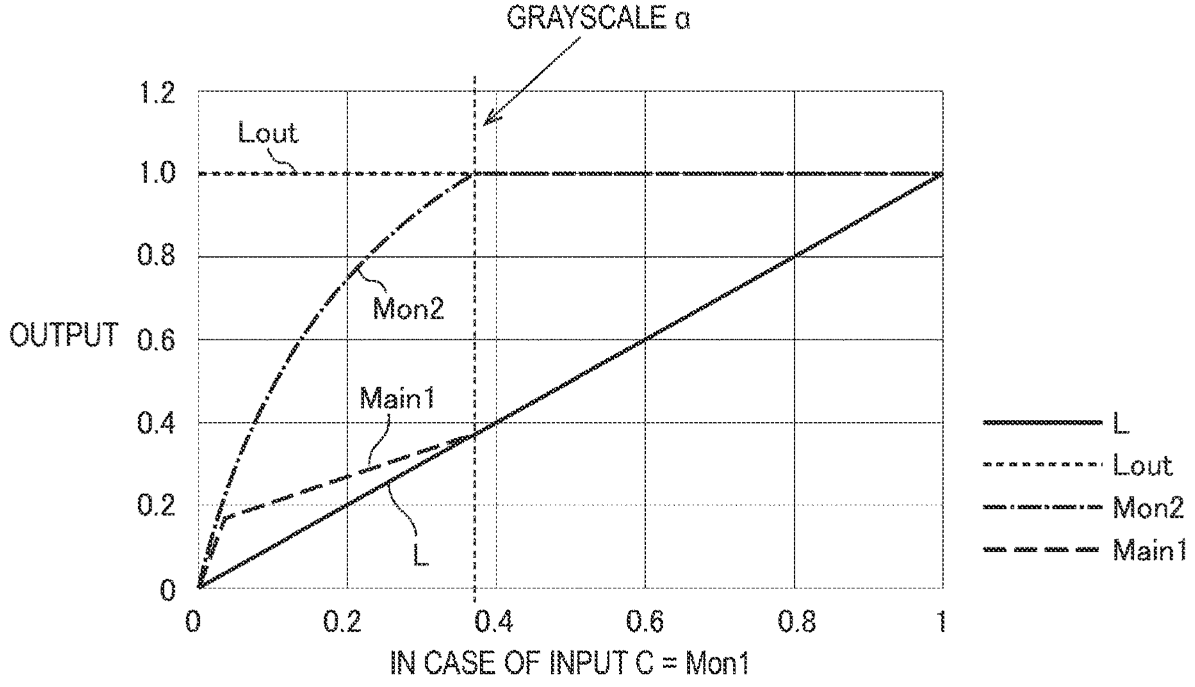
FIG. 8 is a graph showing a relationship between a first aperture ratio of a picture element of the first liquid crystal panel, a second aperture ratio of a pixel of the second liquid crystal panel, and a normalized luminance of a light-emitting region of the backlight of the liquid crystal display of the first embodiment, and a normalized luminance of light recognized by a person.

FIG. 8 is a graph showing a relationship between the first aperture ratio Main1 of the picture elements PE, the second aperture ratio Mon2 of the pixels 2PX, the normalized luminance Lout of the light-emitting regions LER, and a normalized luminance L of light recognized by a person, in the case of an input image with C=Mon1 (e.g., a case of an input image in which all pixels have the same color). Although an actual input image has pixels of various grayscale values, a case of an input image with C=Mon1 as described above will be described for the sake of simplified explanation. Further, in the present embodiment, since the backlight BL has a maximum value at all times, the normalized luminance Lout of each light-emitting region LER is "1" at all times. The value of Mon2 decreases at an input grayscale value equal to or less than the first predetermined value α. The reason for this is that correction is performed to reduce the value of Mon2 at an input grayscale value equal to or less than the first predetermined value α as described above so that the difference that makes the actual transmittance of each picture element PE of the first liquid crystal panel CL greater than the theoretical transmittance of each picture element PE is offset.

According to the liquid crystal display 1000 of the present embodiment, since the lookup table LUT1 and the LUT2 as described above are provided, a graph having the relationship as shown in FIG. 8 can be drawn.

Second Embodiment

A liquid crystal display 1000 according to a second embodiment will be described with reference to FIGS. 9 and 10. Note that description of points similar to those in the first embodiment will not be repeated below. In the present embodiment, unlike the liquid crystal display 1000 of the first embodiment, the backlight BL may be dimmed. The liquid crystal display 1000 according to the present embodiment is different from the liquid crystal display 1000 of the first embodiment in that the backlight BL is dimmed. The liquid crystal display 1000 according to the present embodiment has similar configurations to those of the liquid crystal display 1000 according to the first embodiment with respect to other points.

Figure 9:
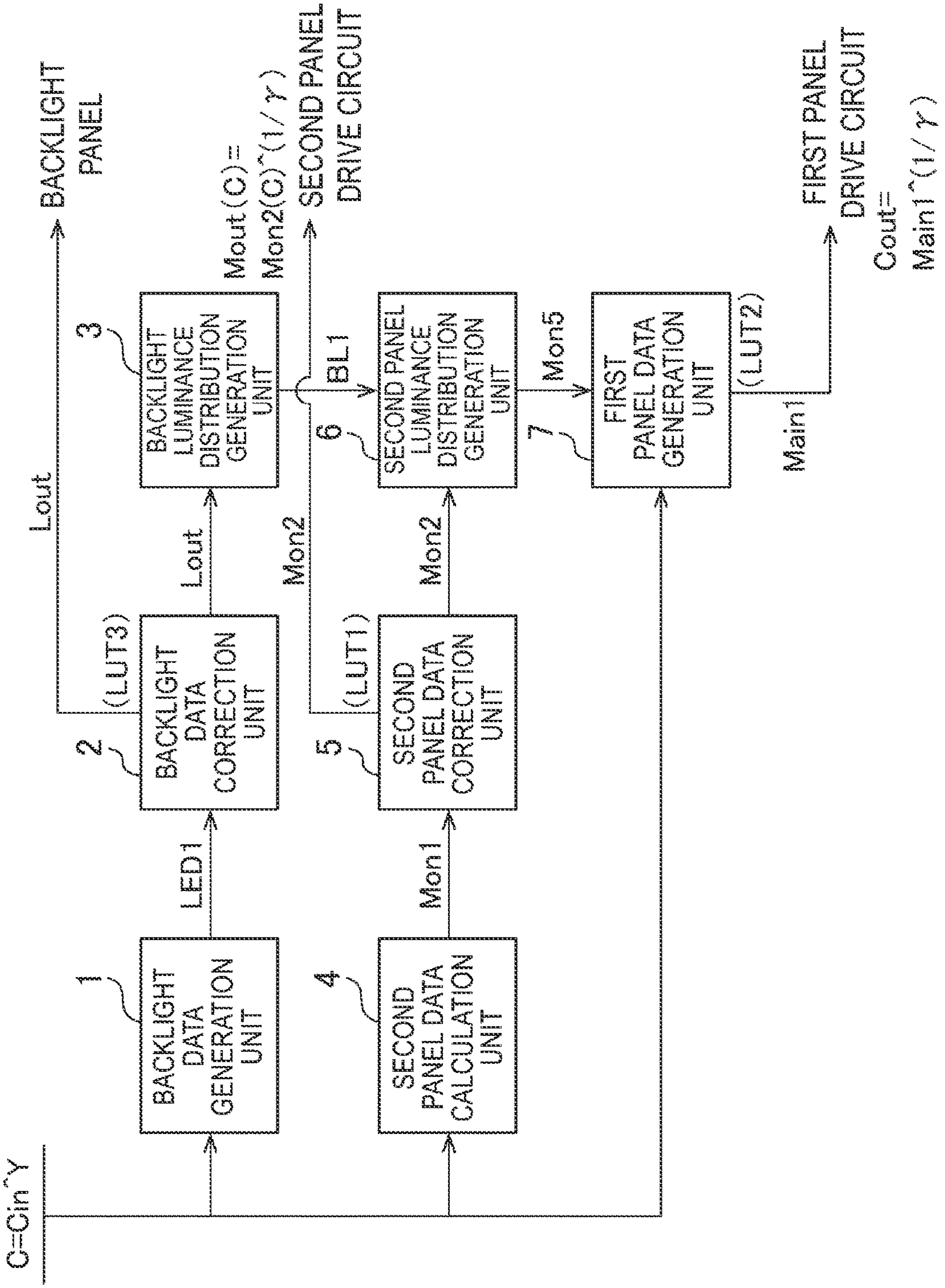
FIG. 9 is a block diagram for describing a characteristic configuration of a liquid crystal display according to a second embodiment.

FIG. 9 is a block diagram for describing a characteristic configuration of an image processing device 100 according to the present embodiment.

The characteristic configuration of the image processing device 100 according to the present embodiment is as follows.

The display panel unit 10 includes a backlight BL facing a second liquid crystal panel WB and having a plurality of light-emitting regions LER. A backlight data generation unit 1 generates backlight data for controlling each of a plurality of normalized luminances LED1 of the plurality of light-emitting regions LER based on input image data. A backlight data correction unit 2 corrects the normalized luminance LED1 of backlight data. A backlight luminance distribution generation unit 3 generates a normalized luminance BL1 of backlight luminance distribution data of the backlight BL based on a normalized luminance Lout of post-correction backlight data. A second panel luminance distribution generation unit 6 generates a normalized luminance Mon5 of panel luminance distribution data based on a second aperture ratio Mon2 of post-correction second panel data and the normalized luminance BL1 of the backlight luminance distribution data.

The backlight data correction unit 2 performs correction as follows for each of one or two or more light-emitting regions among the plurality of light-emitting regions LER.

A ratio of an actual luminance of the backlight BL to a maximum luminance of the backlight BL included in the backlight luminance distribution data is set as a normalized luminance BL1. A ratio of an actual input grayscale value to a maximum input grayscale value included in input image data is set as a normalized input grayscale value C.

The backlight data correction unit 2 corrects the normalized luminance LED1 included in the backlight data so that the normalized luminance BL1 is greater than the normalized input grayscale value C for each of the above-described one or two or more light-emitting regions.

In addition, the backlight data correction unit 2 and the second panel data correction unit 5 correct the backlight data and the second panel data for each of one or two or more pixels 2PX of a plurality of pixels 2PX. As a result, for each of the one or two or more pixels 2PX, the product of the normalized luminance BL1 included in the generated backlight data luminance distribution data and the second aperture ratio Mon2 included in the post-correction second panel data is a value greater than the normalized input grayscale value C.

Hereinafter, a characteristic configuration of the image processing device 100 according to the present embodiment will be described in detail.

The image processing device 100 according to the present embodiment performs dimming of the backlight BL in addition to the processing of the image processing device 100 according to the first embodiment as illustrated in FIG. 9.

When the backlight BL and the second liquid crystal panel WB are independently controlled, there is a possibility that a state BL1×Mon2<Cin occurs, and there is concern that the first liquid crystal panel CL has an insufficient luminance. Thus, correction based on data tables LUT1, LUT2, and LUT3 is performed to satisfy the following conditions.

The lookup table LUT1 is a data table for performing correction to satisfy the condition of x≤Mon2(x): <x=Mon1>.

In the present embodiment, for example, it is assumed that LUT1(x)≥T-M_ideal(x)/T-Main(x):<x=Mon1> is satisfied.

The lookup table LUT2 corrects the input grayscale value C such that an aperture ratio Main1 of each of a group of picture elements PE included in generated first panel data monotonically increases to an aperture ratio C of each of a group of picture elements PE included in input grayscale data.

For example, LUT2(x)=1/x:<x=Mon5>. The lookup table LUT2 divides the input grayscale value C by a normalized luminance Mon5 such that an actual transmittance gets close to a theoretical transmittance for the picture element PE corresponding to the input grayscale value C that is equal to or less than a first predetermined value α. A first aperture ratio Main1 is thereby generated.

The lookup table LUT3 performs correction such that x≤Lout(x):<x is LED1> is satisfied.

The lookup tables LUT1 and LUT3 perform correction such that BL1×Mon2≥C is satisfied.

Thus, for example, it is assumed that LUT3(x)≥T-M_ideal(x)/LUT4(x):<x is a certain grayscale value> is satisfied.

The above-described expression has the following meaning.

The lookup table LUT3 is a lookup table for performing correction such that a normalized luminance Lout of each light-emitting region LER of the backlight BL does not become higher than as required, taking a deviation of a transmittance of each pixel 2PX of the second liquid crystal panel WB from a theoretical value into consideration.

The second liquid crystal panel WB slightly reduces the luminance of the light-emitting regions LER of the backlight BL in the regions having a grayscale value equal to or lower than a second predetermined value β to offset the increased amount of the theoretical transmittance. The second predetermined value β will be described later with reference to FIG. 11.

When the theoretical transmittance of the pixels 2PX of the second liquid crystal panel WB is set as T-MONO_ideal and the actual transmittance of the pixels 2PX of the second liquid crystal panel WB is set as T-MONO_real, the following relationship is satisfied.

$$\mathrm{LUT3}(x) \geq T\text{-MONO\_ideal}(x)/T\text{-MONO\_real}(x): <x=\mathrm{LED1}>$$

Here, the theoretical transmittance of the pixels 2PX of the second liquid crystal panel WB and the theoretical transmittance of the picture elements PE of the first liquid crystal panel CL are the same. For this reason, the following expression is established.

$$T\text{-MONO\_ideal}(x)=T\text{-}M\text{\_ideal}(x): <x \text{ is a certain grayscale value}>$$

In addition, the theoretical transmittance T-MONO_ideal of the pixels 2PX of the second liquid crystal panel WB is assumed to be implemented as a lookup table LUT4. That is, LUT4(x)=T-MONO_real(x):<x is a certain grayscale value>.

The following expression is established based on the above conditions.

$$\mathrm{LUT3}(x) \geq T\text{-}M\text{\_ideal}(x)/\mathrm{LUT4}(x): <x \text{ is a certain grayscale value}>$$

The flow of data in the above-described image processing device 100 is as follows when being described using only reference symbols.

$$C=C\mathrm{in}\hat{}\gamma$$

$$\mathrm{LUT1}(x) \geq T\text{-}M\text{\_ideal}(x)/T\text{-Main}(x): <x=Mon1>$$

Mon1 is a maximum value of a plurality of normalized input grayscale values C each corresponding to the plurality of picture elements PE being faced by one pixel 2PX.

$$Mon2=\mathrm{LUT1}(Mon1)$$

Mon 5=Mon2×BL1:Mon5 is the amount of light reaching the first liquid crystal panel CL (including the influence of an optical filter and the influence of the resolution of the first liquid crystal panel CL).

$$\mathrm{LUT2}(x)=1/x$$

$$\mathrm{Main1}=C\times\mathrm{LUT2}(Mon5)$$

$$C\mathrm{out}=\mathrm{Main1}\hat{}(1/\gamma)$$

$$L\mathrm{out}=\mathrm{LUT3}(\mathrm{LED1})$$

Figure 10:
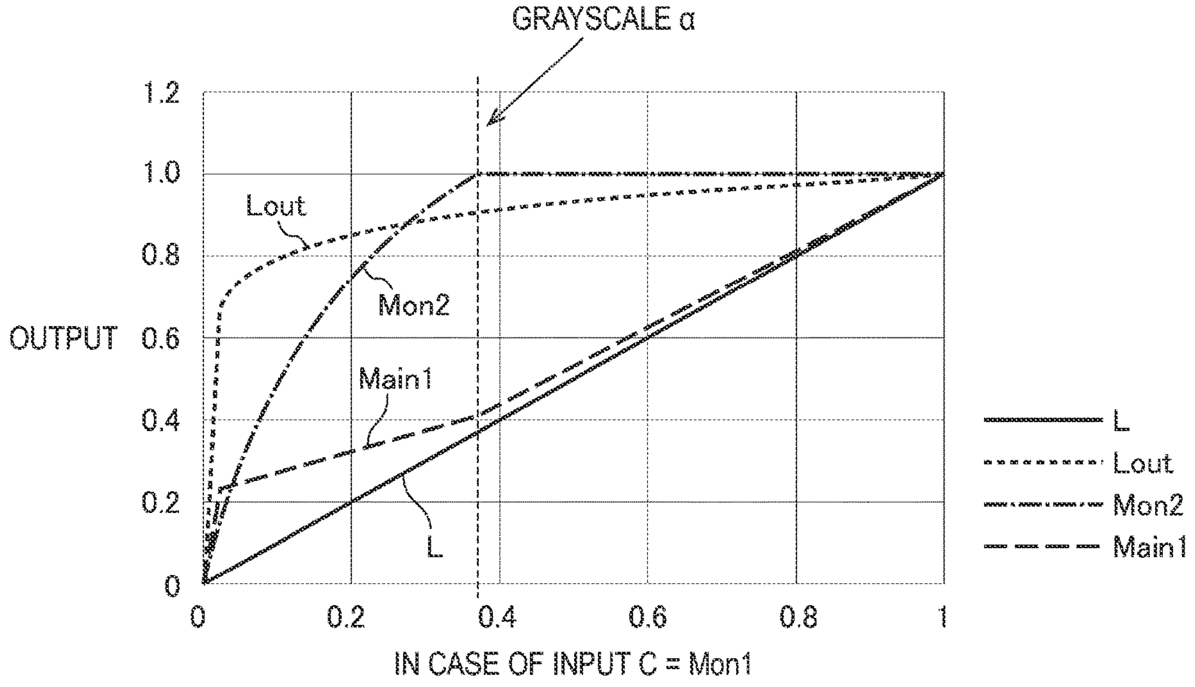
FIG. 10 is a graph showing a relationship between a first aperture ratio of a picture element of a first liquid crystal panel, a second aperture ratio of a pixel of a second liquid crystal panel, and a normalized luminance of a light-emitting region of a backlight of the liquid crystal display of the second embodiment, and a normalized luminance of light recognized by a person.

FIG. 10 is a graph showing a relationship between the first aperture ratio Main1 of the picture elements PE, the second aperture ratio Mon2 of the pixels 2PX, the normalized luminance Lout of the light-emitting regions LER, and a normalized luminance L of light recognized by a person, in the case of an input image with C=Mon1.

According to the liquid crystal display 1000 of the present embodiment, since the above-described lookup tables are provided, a graph having the relationship as shown in FIG. 10 can be drawn.

Third Embodiment

A liquid crystal display 1000 according to a third embodiment will be described with reference to FIGS. 11 to 13. Note that description of points similar to those in the first embodiment will not be repeated below. The liquid crystal display 1000 according to the present embodiment differs from the liquid crystal display 1000 of the first embodiment in that a second panel transmittance correction unit 56 is added. The liquid crystal display 1000 according to the present embodiment has similar configurations to those of the liquid crystal display 1000 according to the first embodiment with respect to other points.

Figure 11:
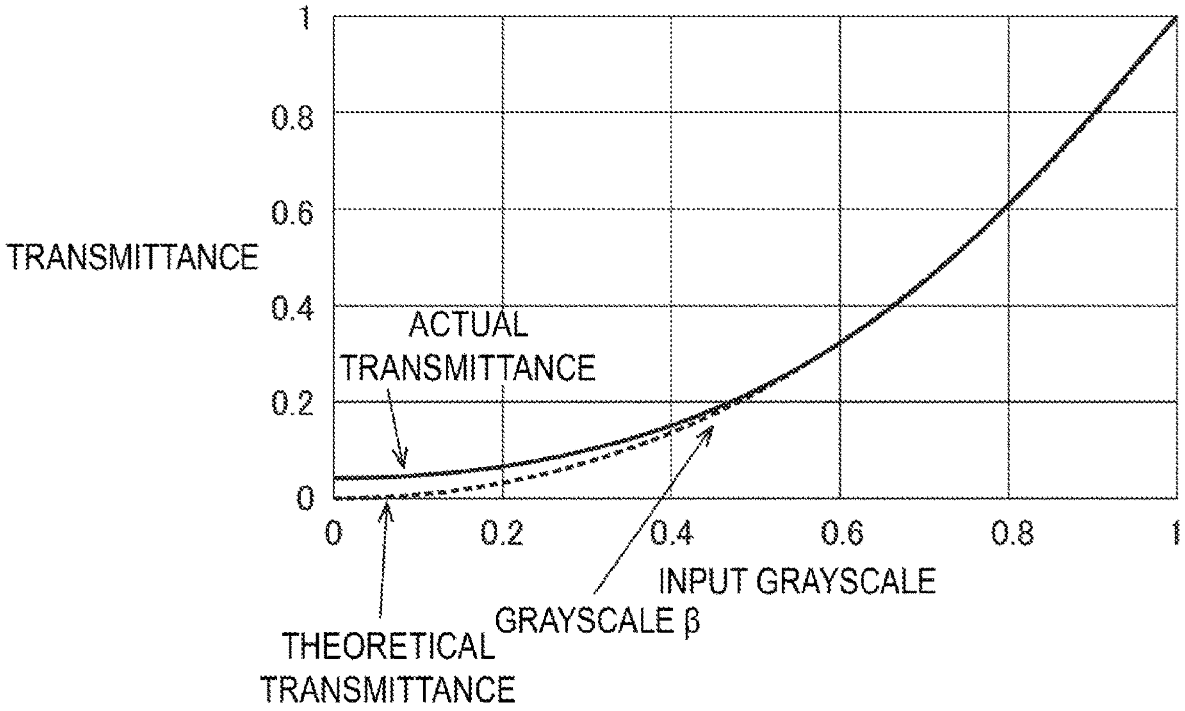
FIG. 11 is a graph showing a relationship between a theoretical transmittance and an actual transmittance of a pixel of a second liquid crystal panel of a liquid crystal display according to a third embodiment.

FIG. 11 is a graph showing a relationship between a theoretical transmittance and an actual transmittance of a pixel 2PX of a second liquid crystal panel WB of the liquid crystal display 1000 according to the present embodiment.

As shown in FIG. 11, the transmittance of the pixel 2PX in the second liquid crystal panel WB deviates from the theoretical value of γ characteristics in the case in which the grayscale value is equal to or less than the second predetermined value β, in the same manner as the transmittance of a picture element PE of a first liquid crystal panel CL. The second predetermined grayscale value β is a value at which a display luminance of the second liquid crystal panel WB starts diverging from the theoretical value. In the present embodiment, a second panel data correction unit 5 corrects the deviation of the transmittance of the picture element PE of the first liquid crystal panel CL from the theoretical value. In addition, the second panel transmittance correction unit 56 corrects the deviation of the transmittance of the pixel 2PX of the second liquid crystal panel WB from the theoretical value.

Figure 12:
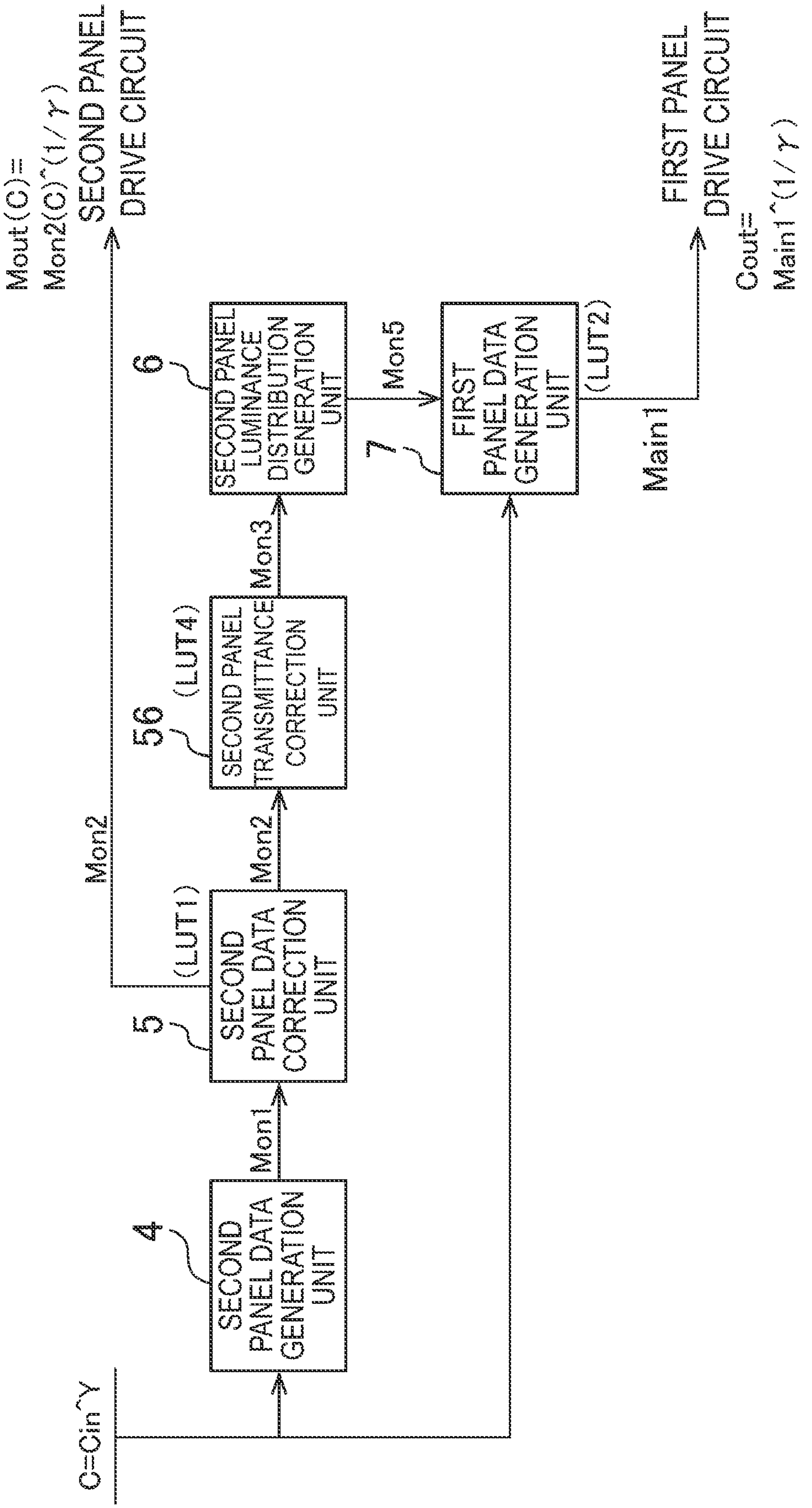
FIG. 12 is a block diagram for describing a characteristic configuration of the liquid crystal display according to the third embodiment.

FIG. 12 is a block diagram for describing a characteristic configuration of the liquid crystal display 1000 according to the present embodiment.

In the present embodiment, the second panel transmittance correction unit 56 is provided between the second panel data correction unit 5 and a second panel luminance distribution generation unit 6, as illustrated in FIG. 12, in order to modify the above-described deviation, that is, the divergence. Accordingly, in an image processing device 100 of the present embodiment, the second panel transmittance correction unit 56 corrects the transmittance of each pixel 2PX of the second liquid crystal panel WB, in addition to the processing of the image processing device 100 according to the first embodiment. More specifically, the second panel transmittance correction unit 56 corrects a second aperture ratio Mon2 included in post-correction second panel data used in calculating a luminance distribution of the second liquid crystal panel WB to an actual transmittance Mon3 corresponding to the second aperture ratio Mon2. The value of the actual transmittance Mon3 corresponding to the second aperture ratio Mon2 is a value measured in advance.

The second panel data correction unit 5 performs correction to satisfy the following conditions using a lookup table LUT1.

The lookup table LUT1 is assumed to be a data table for correcting Mon1 to satisfy $x \leq Mon2(x) <x=Mon1>$.

A lookup table LUT2 is a data table for correcting an input grayscale value C to monotonically increase a first aperture ratio Main1.

A lookup table LUT4 is a data table for correcting the second aperture ratio Mon2 of the pixel 2PX of the second liquid crystal panel WB to an actual transmittance Mon3 corresponding to the second aperture ratio Mon2. The value of the actual transmittance Mon3 corresponding to the second aperture ratio Mon2 is a value measured in advance. Thus, $LUT4(x)=T\text{-}MONO\_real(x):<x=Mon2>$ is satisfied as described according to the third embodiment above.

The flow of data in the above-described image processing device 100 is as follows when being described using only symbols.

$$C=Cin^{\wedge}\gamma$$

$$LUT1(x) \geq T\text{-}M\_ideal(x)/T\text{-}Main(x):<x=Mon1>$$

Mon1 is a maximum value of a plurality of normalized input grayscale values C each corresponding to the plurality of picture elements PE being faced by one pixel 2PX.

$$Mon2=LUT1(Mon1)$$

$$Mon3=LUT4(Mon2)$$

$$LUT2(x)=1/x$$

$$Main1=C \times LUT2(Mon5)$$

Mon5 is the amount of light reaching the first liquid crystal panel CL (a value including the influence of an optical filter and the influence of the resolution of the first liquid crystal panel CL) with Mon2 display.

$$Cout=Main1^{\wedge}(1/\gamma)$$

Figure 13:
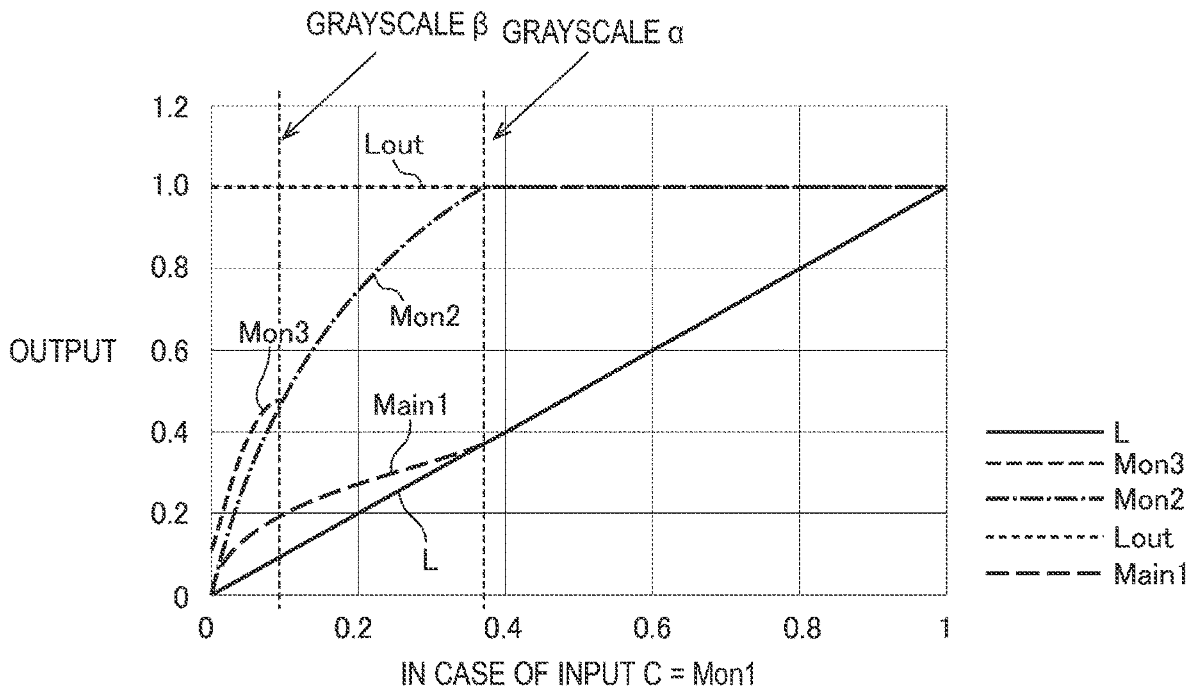
FIG. 13 is a graph showing a relationship between a first aperture ratio of a picture element of a first liquid crystal panel, a second aperture ratio and an actual transmittance of a pixel of the second liquid crystal panel, and a normalized luminance of a light-emitting region of a backlight of the liquid crystal display of the third embodiment, and a normalized luminance of light recognized by a person.

FIG. 13 is a graph showing a relationship between the first aperture ratio Main1 of a picture element PE, the second aperture ratio Mon2 and an actual transmittance Mon3 of a pixel 2PX, a normalized luminance Lout of a light-emitting region LER, and a normalized luminance L of light recognized by a person, in the case of an input image with C=Mon1. Mon3 is a value greater than Mon2 in the region in which the grayscale value is equal to or less than the second predetermined grayscale value because the second panel transmittance correction unit 56 corrects the deviation of the transmittance of the pixel 2PX of the second liquid crystal panel WB from the theoretical value.

According to the liquid crystal display 1000 of the present embodiment, since the above-described lookup tables are provided, a graph having the relationship as shown in FIG. 13 can be drawn.

A characteristic configuration of the image processing device 100 according to the present embodiment is as follows.

The image processing device 100 according to the present embodiment further includes the second panel transmittance correction unit 56 that corrects the second aperture ratio Mon2 included in the post-correction second panel data again. The second panel luminance distribution generation unit 6 uses the second panel data corrected by the second panel transmittance correction unit 56 to generate a normalized Mon5 included in luminance distribution data of the second liquid crystal panel. The second panel transmittance correction unit 56 corrects the second aperture ratio Mon2 to data indicating the actual transmittance Mon3 corresponding to the second aperture ratio Mon2 for one or two or more pixels 2PX among the plurality of pixels 2PX having an input grayscale value equal to or less than the second predetermined value β. The second aperture ratio Mon2 is included in the post-correction second panel data. The actual transmittance Mon3 is a measurement value of the transmittance measured with each of the pixels 2PX having the second aperture ratio.

Fourth Embodiment

A liquid crystal display 1000 according to a fourth embodiment will be described with reference to FIGS. 14 and 15. Note that description of points similar to those in the first to third embodiments will not be repeated below. The liquid crystal display 1000 according to the present embodiment differs from the liquid crystal display 1000 of the first embodiment in that dimming of the backlight BL is performed and a second panel transmittance correction unit 56 is added. The liquid crystal display 1000 according to the present embodiment has similar configurations to those of the liquid crystal display 1000 according to the first embodiment with respect to other points.

Figure 14:
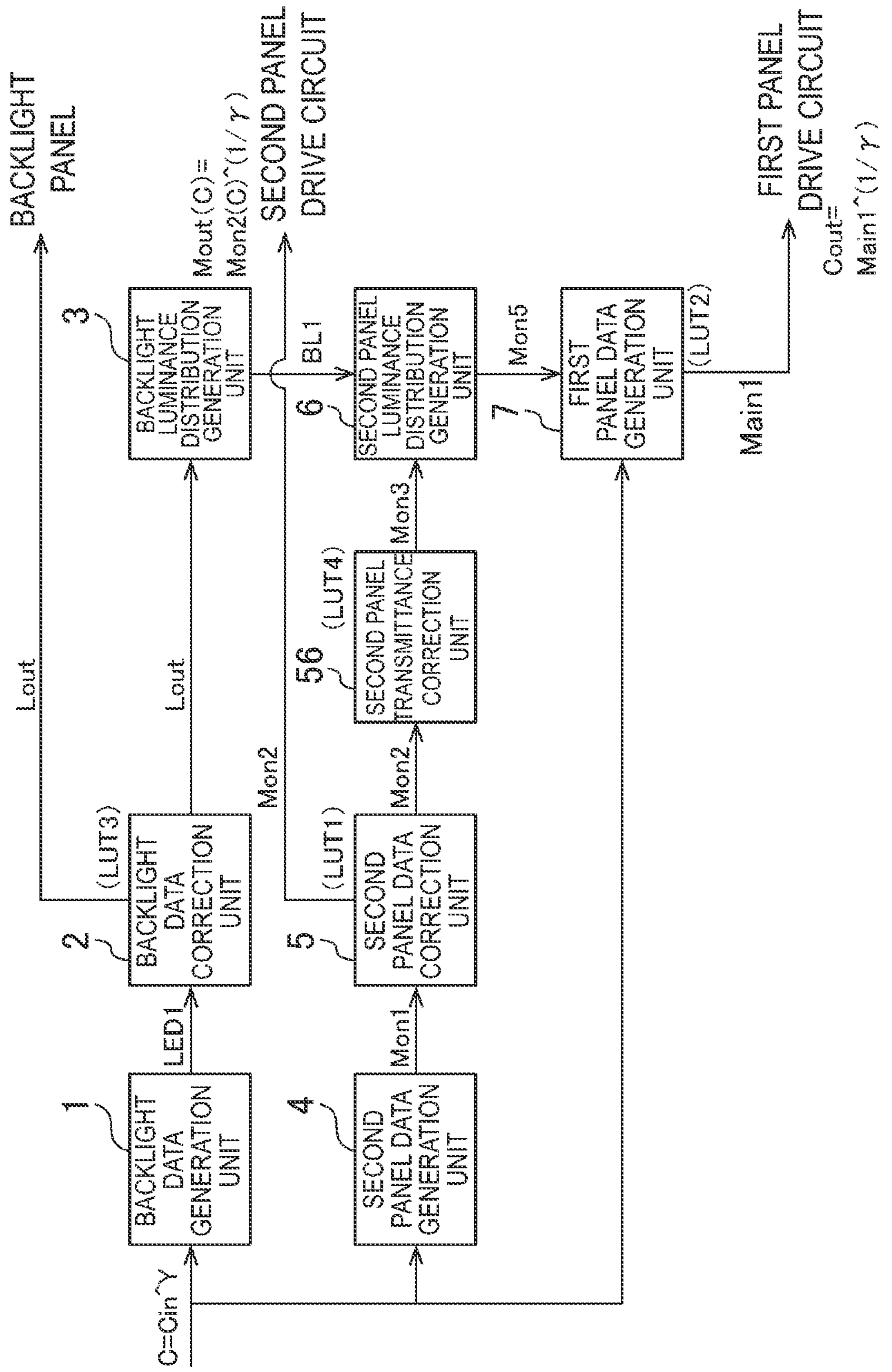
FIG. 14 is a block diagram for describing a characteristic configuration of a liquid crystal display according to a fourth embodiment.

FIG. 14 is a block diagram for describing a characteristic configuration of the liquid crystal display 1000 according to the present embodiment.

The backlight data correction unit 2 corrects the normalized luminance LED1 for each of the one or two or more pixels 2PX among the plurality of pixels 2PX having a normalized input grayscale value being equal to or less than the second predetermined value β. Specifically, a backlight data correction unit 2 corrects the normalized luminance LED1 included in backlight data of at least one light-emitting region LER facing the one or two or more pixels 2PX described above. The backlight data correction unit 2 corrects the normalized luminance LED1 for each of the one or two or more pixels 2PX among the plurality of pixels 2PX having a normalized input grayscale value being equal to or less than the second predetermined value R so that the actual transmittance gets closer to the theoretical transmittance. The post-correction backlight data output from the backlight data correction unit 2 includes a normalized luminance Lout corrected by the backlight data correction unit 2.

The image processing device 100 according to the present embodiment dims the backlight BL in addition to performing the processing of the image processing device 100 according to the third embodiment, or corrects the transmittance of each pixel 2PX of the second liquid crystal panel WB in addition to performing the processing of the image processing device 100 according to the second embodiment.

When the backlight BL and the second liquid crystal panel are independently controlled, there is a possibility that BL1×Mon2<C is satisfied, and there is concern that the first liquid crystal panel CL has an insufficient luminance.

Thus, the second panel data correction unit 5 performs correction to satisfy the following conditions.

It is assumed that a lookup table LUT1 satisfies x≤Mon2 (x)<x=Mon1>.

For example, LUT1(x)≥T-M_ideal(x)/T-Main(x) <x=Mon1> is assumed.

A lookup table LUT2 is set to monotonically increase the first aperture ratio Main1.

A lookup table LUT4 is a lookup table for correcting the second aperture ratio Mon2 of the pixel 2PX of the second liquid crystal panel WB to an actual transmittance Mon3 corresponding to the second aperture ratio Mon2.

A lookup table LUT3 is set to satisfy the condition x≤Lout(x):<x is LED1>.

The lookup tables LUT1 and LUT3 are set to satisfy the condition BL1×Mon2≥C.

Thus, for example, LUT3(x)≥T-M_ideal(x)/LUT4 (x) is satisfied.

The flow of data in the above-described image processing device 100 is as follows when being described using only reference symbols.

$$C = Cin^{\gamma}$$

$$LUT1(x) \geq T\text{-}M\_ideal(x)/T\text{-}Main(x) : <x = Mon1>$$

Mon1 is the maximum value of normalized input grayscale values C of several picture elements PE included in a specific region, for example, a region facing one light-emitting region LER.

$$Mon2 = LUT1(Mon1)$$

$$Mon3 = LUT4(Mon2)$$

Mon 5=Mon2×BL1 (Mon5 is the amount of light reaching the first liquid crystal panel CL. This amount of light is a value including the influence of an optical filter and the influence of the resolution of the first liquid crystal panel CL)

$$LUT2(x) = 1/x$$

$$Main1 = C \times LUT2(Mon5)$$

$$Cout = Main1^{(1/\gamma)}$$

Figure 15:
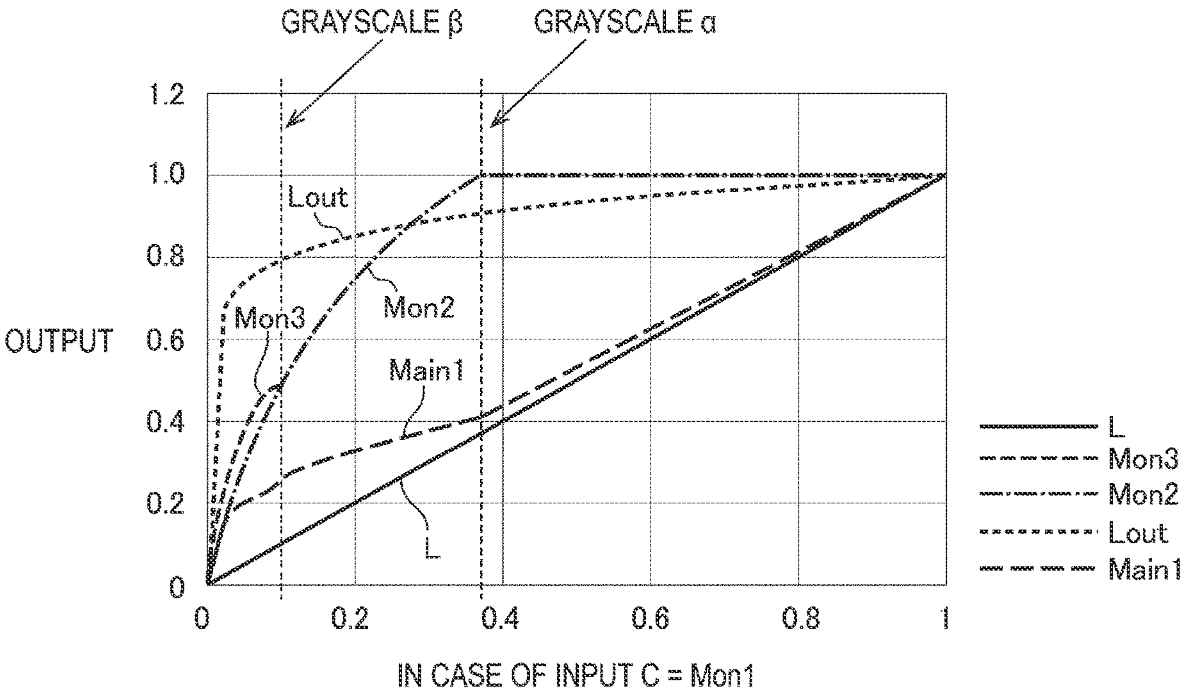
FIG. 15 is a graph showing a relationship between a first aperture ratio of a picture element of a first liquid crystal panel, a second aperture ratio and an actual transmittance of a pixel of a second liquid crystal panel, and a normalized luminance of a light-emitting region of a backlight of the liquid crystal display of the fourth embodiment, and a normalized luminance of light recognized by a person.

FIG. 15 is a graph showing a relationship between the first aperture ratio Main1 of a picture element PE, the second aperture ratio Mon2 and an actual transmittance Mon3 of a pixel 2PX, a normalized luminance Lout of a light-emitting region LER, and a normalized luminance L of light recognized by a person, in the case of an input image with C=Mon1.

According to the liquid crystal display 1000 of the present embodiment, since the above-described lookup tables are provided, a graph having the relationship as shown in FIG. 15 can be drawn.

As can be seen from the above, the present embodiment includes both the characteristic configuration of the liquid crystal display 1000 according to the second embodiment and the characteristic configuration of the liquid crystal display 1000 of the third embodiment. For this reason, both the effect obtained by the liquid crystal display 1000 according to the second embodiment and the effect obtained by the liquid crystal display 1000 of the third embodiment can be obtained.

Fifth Embodiment

The liquid crystal display 1000 of the present embodiment has a space in which image processing of each unit of the image processing device 100 is executed being different from that of the liquid crystal displays 1000 of the first to fourth embodiments. The liquid crystal display 1000 according to the present embodiment has similar configurations to those of the liquid crystal displays 1000 according to the first to fourth embodiments with respect to other points.

Whereas the image processing device 100 performs arithmetic processing in the linear space in the first to fourth embodiments, the image processing device 100 of the present embodiment performs arithmetic processing in a gamma space. That is, an input grayscale value C included in input image data is input to the image processing device 100 without being subject to gamma correction. Furthermore, the image processing device 100 outputs each of first panel data and second panel data to the first liquid crystal panel CL and the second liquid crystal panel WB without performing inverse gamma correction thereon. Even with this configuration, the same effects as those obtained by the image processing devices 100 of the first to fourth embodiments can be obtained.

Sixth Embodiment

A liquid crystal display 1000 of the present embodiment differs from the liquid crystal displays 1000 of the first to fifth embodiments in that each part of the image processing device 100 is realized through control processing performed in an image processing program. The liquid crystal display 1000 according to the present embodiment has similar configurations to those of the liquid crystal displays 1000 according to the first to fifth embodiments with respect to other points.

More specifically, the backlight data generation unit 1, the backlight data correction unit 2, the backlight luminance distribution generation unit 3, and the second panel data generation unit 4 are realized through control processing executed by the image processing program. In addition, in the first to fifth embodiments, the second panel data correction unit 5, the second panel luminance distribution generation unit 6, and the first panel data generation unit 7 are also realized through control processing executed by the image processing program. Furthermore, in the third to fifth embodiments, the second panel transmittance correction unit 56 is also realized through control processing executed by the image processing program.

In other words, a computer serving as the image processing device 100 includes a processor that operates in accordance with the image processing program, for example, a central processing unit (CPU), as a main hardware configuration. The type of processor does not matter as long as it can realize functions by executing the image processing program. The processor is configured with one or multiple electronic circuits including a semiconductor integrated circuit, for example, an integration circuit (IC) or a large scale integration (LSI). The multiple electronic circuits may be integrated into one chip, or may be provided in a plurality of chips. The plurality of chips may be aggregated into one device, or may be provided in a plurality of devices.

The image processing program is recorded in a non-transitory recording medium such as a computer-readable read only memory (ROM), an optical disk, a hard disk drive, or the like. A content providing program may be stored in advance in the recording medium, or may be supplied to the recording medium via a wide-area communication network including the Internet or the like.

What is claimed is:

1. An image processing device causing a display panel unit to display an image, the display panel unit including a first liquid crystal panel including a plurality of picture elements and a second liquid crystal panel facing the first liquid crystal panel and including a plurality of pixels, the image processing device comprising:

a second panel data generation unit configured to generate second panel data for controlling a second aperture ratio of each of the plurality of pixels based on input image data;

a second panel data correction unit configured to correct the second panel data;

a second panel luminance distribution generation unit configured to generate panel luminance distribution data of the second liquid crystal panel based on the second panel data after correction; and a first panel data generation unit configured to generate first panel data for controlling a first aperture ratio of each of the plurality of picture elements based on the input image data and the panel luminance distribution data of the second liquid crystal panel, wherein, for each of one or two or more picture elements among the plurality of picture elements, the one or two or more picture elements having a normalized input grayscale value included in the input image data being equal to or less than a first predetermined value, the second panel data correction unit corrects the second aperture ratio of each of at least one pixel among the plurality of pixels, the at least one pixel facing the one or two or more picture elements, to offset an amount of deviation of an actual transmittance of the picture elements from a theoretical transmittance of the picture elements, and the first panel data generation unit generates the first aperture ratio for each of the plurality of picture elements by dividing the normalized input grayscale value included in the input image data by a normalized luminance included in the panel luminance distribution data.

2. The image processing device according to claim 1, the display panel unit further including a backlight facing the second liquid crystal panel and having a plurality of light-emitting regions, the image processing device further comprising:

a backlight data generation unit configured to generate backlight data for controlling each of a plurality of normalized luminances of the plurality of light-emitting regions based on the input image data;

a backlight data correction unit configured to correct the backlight data; and a backlight luminance distribution generation unit configured to generate backlight luminance distribution data of the backlight based on the backlight data after correction, wherein the second panel luminance distribution generation unit generates the panel luminance distribution data based on the second panel data after correction and backlight luminance distribution data, and for each of one or two or more light-emitting regions among the plurality of light-emitting regions, the backlight data correction unit corrects the normalized luminance included in the backlight data to set the normalized luminance included in the backlight luminance distribution data to be greater than the normalized input grayscale value included in the input image data.

3. The image processing device according to claim 2, wherein, for each of the one or two or more pixels, the backlight data correction unit and the second panel data generation unit each correct the backlight data and the second panel data to set a product of the normalized luminance included in the backlight luminance distribution data and the second aperture ratio included in the second panel data after correction to have a value greater than the normalized input grayscale value.

4. The image processing device according to claim 2, wherein, for each of one or two or more pixels among the plurality of pixels, the one or two or more pixels having the normalized input grayscale value equal to or less than a second predetermined value, the backlight data correction unit corrects the backlight data of at least one light-emitting region among the plurality of light-emitting regions, the at least one light-emitting region facing the one or two or more pixels, to offset an amount of deviation of an actual transmittance of the pixels from a theoretical transmittance of the pixels.

5. The image processing device according to claim 1, further comprising:

a panel transmittance correction unit configured to correct again the second panel data after correction, wherein the second panel luminance distribution generation unit generates the panel luminance distribution data of the second liquid crystal panel using the second panel data corrected by the panel transmittance correction unit, and for the one or two or more pixels among the plurality of pixels, the one or two or more pixels having the normalized input grayscale value equal to or less than the second predetermined value, the panel transmittance correction unit corrects the second panel data after correction to data indicating an actual transmittance corresponding to the second aperture ratio included in the second panel data after correction.

6. The image processing device according to claim 1, wherein a resolution of the plurality of picture elements of the first liquid crystal panel is higher than a resolution of the plurality of pixels of the second liquid crystal panel.

* * * * *